United States Patent
Chauvel

(10) Patent No.: US 7,392,269 B2
(45) Date of Patent: Jun. 24, 2008

(54) CONDITIONAL GARBAGE BASED ON MONITORING TO IMPROVE REAL TIME PERFORMANCE

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 351 days.

(21) Appl. No.: 10/631,195

(22) Filed: Jul. 31, 2003

(65) Prior Publication Data

US 2004/0024798 A1 Feb. 5, 2004

Related U.S. Application Data

(60) Provisional application No. 60/400,391, filed on Jul. 31, 2002.

(51) Int. Cl.
*G06F 17/30* (2006.01)
(52) U.S. Cl. ........................ 707/206; 711/170
(58) Field of Classification Search ............... 707/1–10, 707/100–104.1, 200–206; 711/170; 717/116; 712/228, 206
See application file for complete search history.

(56) References Cited

U.S. PATENT DOCUMENTS

| | | | |
|---|---|---|---|
| 5,692,185 A | | 11/1997 | Nilsen et al. |
| 5,857,210 A | * | 1/1999 | Tremblay et al. ........... 707/206 |
| 5,873,105 A | * | 2/1999 | Tremblay et al. ........... 707/206 |
| 6,065,020 A | | 5/2000 | Dussud |
| 6,081,665 A | * | 6/2000 | Nilsen et al. ................ 717/116 |
| 6,098,089 A | * | 8/2000 | O'Connor et al. ........... 718/104 |
| 6,567,905 B2 | | 5/2003 | Otis ........................... 711/170 |
| 6,571,260 B1 | | 5/2003 | Morris ....................... 707/206 |
| 2002/0065990 A1 | | 5/2002 | Chauvel et al. ............ 711/137 |
| 2002/0069332 A1 | | 6/2002 | Chauvel et al. ............ 711/144 |
| 2003/0101320 A1 | | 5/2003 | Chauvel et al. ............ 711/154 |
| 2003/0149864 A1 | * | 8/2003 | Furukawa et al. .......... 712/228 |
| 2004/0098553 A1 | * | 5/2004 | Garthwaite ................. 711/170 |

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

* cited by examiner

*Primary Examiner*—Diane Mizrahi
(74) *Attorney, Agent, or Firm*—Ronald O. Neerings; Wade J. Brady, III; Frederick J. Telecky, Jr.

(57) ABSTRACT

A system comprising a counter adapted to monitor the memory consumption of the allocated memory resources. Upon reaching or surpassing the memory resource threshold provided, the counter may indicate the need for garbage collection. The garbage collector assesses the memory and releases memory resources that are consumed by the programs but are not needed anymore. The recycled memory resources are thus provided to the programs and the counter is updated accordingly. In addition, the system may also include instructions requesting memory resources. After detecting such instructions, the memory usage counter is updated either by the exact amount of memory allocated or the estimated amount of memory allocated. The counter may be implemented in hardware or in software.

22 Claims, 2 Drawing Sheets

CONDITIONAL GARBAGE BASED ON MONITORING TO IMPROVE REAL TIME PERFORMANCE

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO application Ser. No. 03291923.5, filed Jul. 30, 2003 and entitled "Conditional Garbage Based On Monitoring To Improve Real Time Performance," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003; "Memory Management Of Local Variables," Ser. No. 10/632,067, filed Jul. 31, 2003; "Memory Management Of Local Variables Upon A Change Of Context," Ser. No. 10/632,076, filed Jul. 31, 2003; "A Processor With A Split Stack," Ser. No. 10/632,079, filed Jul. 31, 2003; "Using IMPDEP2 For System Commands Related To Java Accelerator Hardware," Ser. No. 10/632,069, filed Jul. 31, 2003; "Test With Immediate And Skip Processor Instruction," Ser. No. 10/632,214, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; "Methods And Apparatuse For Managing Memory," Ser. No. 10/631,252, filed Jul. 31, 2003; "Write Back Policy For Memory," Ser. No. 10/631,185, filed Jul. 31, 2003; "Methods And Apparatuses For Managing Memory," Ser. No. 10/631,205, filed Jul. 31, 2003; "Mixed Stadc-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor" Ser. No. 10/632,216, filed Jul. 31, 2003; "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/632,215, filed Jul. 31, 2003; "Synchronization Of Processor States," Ser. No. 10/632,024, filed Jul. 31, 2003; "Inter-Processor Control," Ser. No. 10/631,120, filed Jul. 31, 2003; "Cache Coherency In A Multi-Processor System,"Ser. No. 10/632,229, filed Jul. 31, 2003; "Concurrent Task Execution In A Multi-Processor, Single Operating System Environment," Ser. No. 10/632,077, filed Jul. 31, 2003; and "A Multi-Processor Computing System Having A Java Stack Machine And A RISC-Based Processor," Ser. No. 10/631,939, filed Jul. 31, 2003.

BACKGROUND OF THE INVENTION

1. Technical Field of the Invention

The present invention relates generally to executing programs and more particularly, to improve the utilization of memory resources by executing a garbage collector.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY OF THE PREFERRED EMBODIMENTS

As disclosed herein, a system (e.g., a cellular telephone) comprises a counter capable of monitoring the usage of memory resources for program execution. The counter monitors the usage of the allocated space and a garbage collector execution is conditioned upon reaching or surpassing a threshold value for the counter. The garbage collector evaluates the state of the memory and frees memory that has been consumed by programs and is not needed anymore.

The system includes a processor that decodes instructions (e.g., standard Java instructions) some of which cause memory request allocation, but may not indicate how much memory is precisely needed directly in the instruction. In this case the decoder may provide information to increment a counter, preferably in hardware, that may indicate the number of memory allocations instead the exact amount of memory used.

The system may also include a micro-sequence or a software task that replaces instructions that request memory resources. During the execution of the micro-sequence or the software task, the counter is updated with the precise memory amount requested, and will increment as the memory is consumed.

When the counter reaches a pre-determined threshold value, either an interruption is generated to signal the need for garbage collection or the JVM or any software task that would initiate the garbage collector task may check the counter periodically to decide when to start garbage collection. The garbage collector frees unused memory and updates the memory use counter accordingly. The counter may be implemented in software or in hardware.

Notation And Nomenclature

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein may be particularly suited for executing Java™ Bytecodes, or comparable code. As is well known, Java is particularly suited for embedded applications and is a relatively "dense" language meaning that on average, each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims that follow. Further, the embodiment of the invention may be described in the context of Java, but should not be limited to the execution of only Java instructions. The processor described herein may be used in a wide variety of electronic systems (e.g., cell phones).

Figure 1:
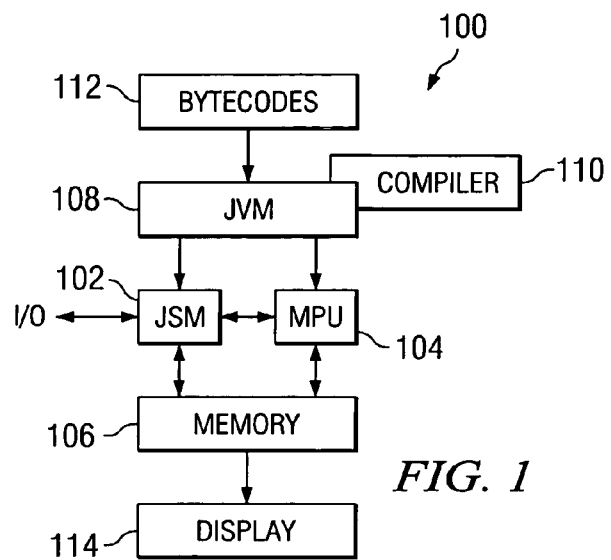
FIG. 1 shows a diagram of a system in accordance with preferred embodiments of the invention and including a Java Stack Machine ("JSM") and a Main Processor Unit ("MPU")

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from. the I/O space into the JSM 102 to be processed by the JSM 102. Other components (not specifically shown) may be included as well.

As is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on. the system, management of the display 114, receiving input from input devices, etc. Without limitation, Java code may be used to perform any one of a variety of applications including multimedia, games or web-based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two instruction sets. One instruction set may comprise standard Java Bytecodes. As is well known, Java is a stack-based programming language in which instructions generally target a stack. For example, an integer add ("IADD") Java instruction pops two integers off the top of the stack, adds them together, and pushes the sum back on the stack. In general, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based instructions. This other instruction set generally complements the Java instruction set and, accordingly, may be referred to as a complementary instruction set architecture ("C-ISA") such as those instructions disclosed in one or more of the previously listed co-pending applications included herein by reference. By complementary, it is meant that at least some Java Bytecodes may be replaced by micro-sequences using C-ISA instructions that permit address calculation to readily "walk through" the JVM data structures. A micro-sequence may comprise one or more C-ISA instructions. Further, such micro-sequences may also include Java Bytecode instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM .102 generally comprises a stack-based architecture for efficient and accelerated execution of Java Bytecodes combined with a register-based architecture for executing register and memory based C-ISA instructions. Both architectures preferably are tightly combined and integrated through the C-ISA.

Figure 2:
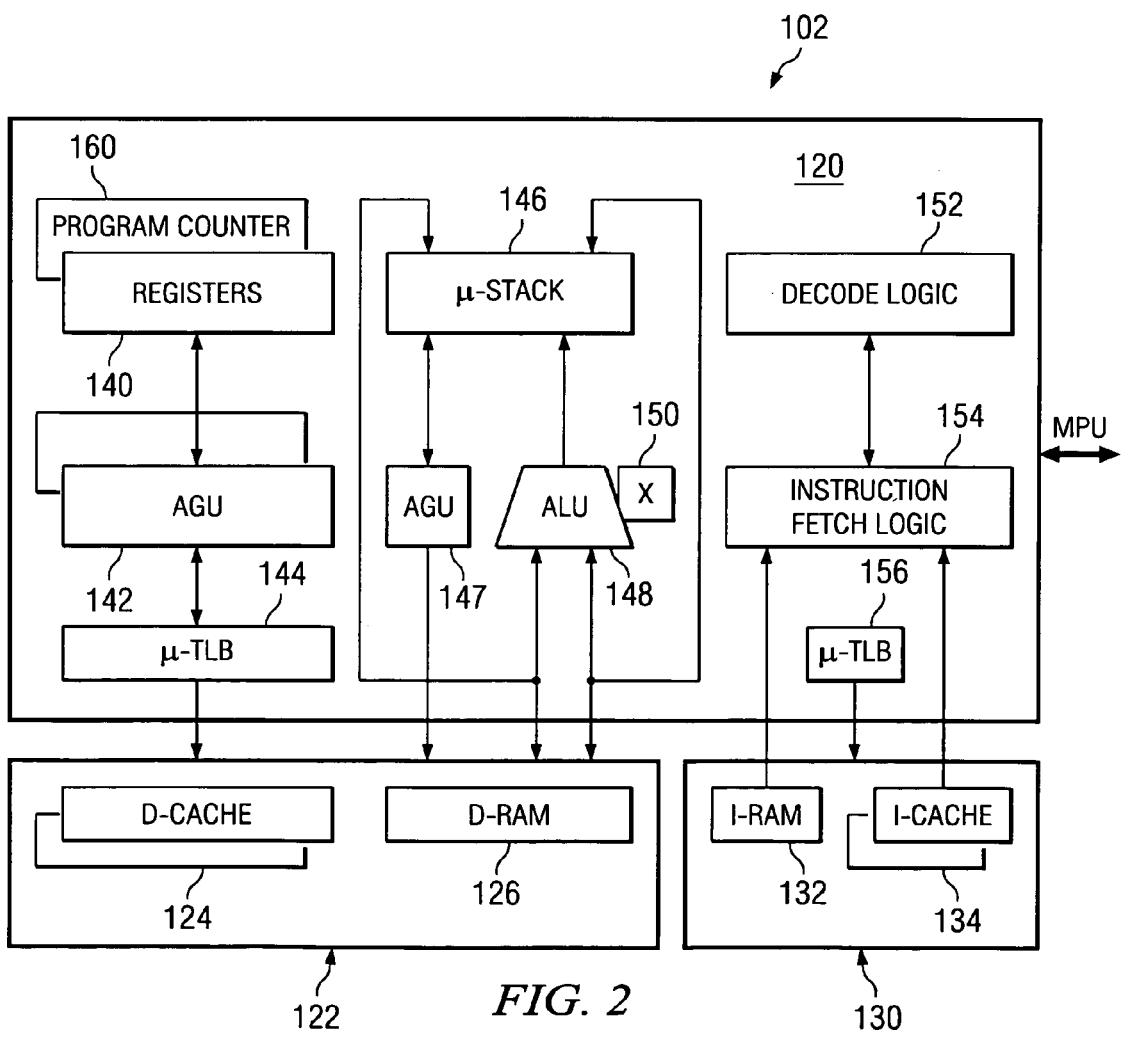
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154, pre-decoded by pre-decode logic, and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 may be adapted to execute both the standard Java instructions as well as the C-ISA instructions of the system.

Figure 3:
FIG. 3 shows various registers used in the JSM of FIGS. 1 and 2.

Referring now to FIG. 3, the ,registers 140 may include 16 registers designated as R0-R15. Registers R0-R3, R5, R8-R11 and R13-R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion ,of memory in which Java local variables may be stored when used by the current Java method. The top of the micro-stack 146 is referenced in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. JSM 102 also may have some additional memory mapped registers not shown in FIG. 2 that includes various control or configuration information usually set by the MPU 104. The counter and threshold described below may be part of those registers.

Referring again to FIG. 2, as noted above, the JSM 102 may execute stack-based instructions and thus the JSM includes a hardware-based micro-stack 146 for storing operands. Unless empty, Java Bytecodes pop data from and push data onto the micro-stack 146. The micro-stack 146 preferably comprises at most the top n entries of a larger stack that may be implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The ALU 148 adds, subtracts, and shifts data and may be adapted to completely execute instructions in less than two cycles. The multiplier 150 may be used to multiply two values together in one or more cycles. The instruction fetch logic 154 generally fetches instructions from instruction storage 130. The decoder 152 may then decode the instructions.

The data storage 122 generally comprises data cache ("D-cache") 124 and data random access memory ("D-RAMset") 126. Reference may be made to copending applications U.S. Ser. Nos. 09/591,537 filed Jun. 9, 2000, 09/591,656 filed Jun. 9, 2000, and 09/932,794 filed Aug. 17, 2001, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAMset 132 may be used for relatively complex micro-sequenced Bytecodes or other micro-sequences or critical sequences of codes. The I-cache 134 may be used to store other types of Java Bytecode and mixed Java/CISA instructions.

As is well known, programs may be executed on processors, such as the JSM 102 or the MPU 104, where each program is allocated a portion of the memory to utilize. Some of the memory is allocated dynamically during the execution of a program, others statically when the program is launched. Programs that allocate memory dynamically preferably free the memory allocated when they do not require it anymore. For example, a program in C may use "malloc( )" and "free( )" library functions to free up memory allocation not needed by the program. In instances where these programs do not free the unused memory correctly, memory leaks occur and usually cause the system to crash after some time. Such events are well known by programmers as a typical fatal error in system called "out of memory error". Java programmers do not need to worry about memory recollection when they write Java programs because the memory recollection in Java is done by a garbage collection task embedded into the JVM. The garbage collection task is independent from the executed Java program and may monitor the allocated memory that can be recycled and put back into the available memory space.

The recycled memory may subsequently be re-allocated to programs when a new memory allocation request occurs through instructions, such as "New" or "NewArray" Java Bytecode. Typically, the garbage collector is a timed operation, where at a certain time interval, the processor will stall, and the garbage collector is initiated to evaluate the usage of memory space. However, in some instances, the garbage collector may not be needed, and thus causing the processor to unnecessarily stall the current program execution and also do unnecessary processing.

Figure 4:
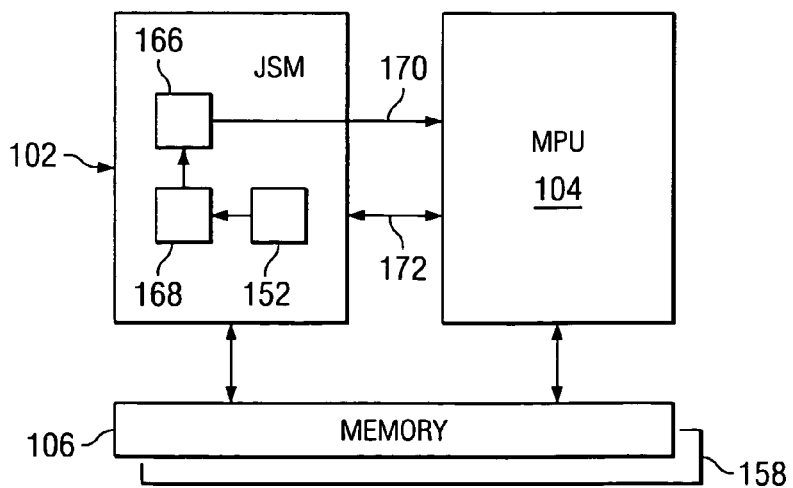
FIG. 4 illustrates a block diagram of a system in accordance with preferred embodiments of the invention including a Main Processor Unit ("MPU") and a garbage collector.

In a preferred embodiment, the execution of the garbage collector 158 may be conditioned upon a precise or approximate usage of memory space, thus avoiding unnecessary garbage collections. Referring to FIG. 4, the JSM 102 is coupled to the MPU 104. The MPU 104 may be coupled to the garbage collector and may be adapted to run the garbage collector 158 within the memory 106. In a preferred embodiment, the JSM 102 may include the memory usage counter 168, where the memory usage counter 168 may be capable of monitoring the memory consumption for one or more programs. More specifically, the memory usage counter 168 may be adapted to increment according to the consumption of the allocated memory for the programs. The counter may be capable of incrementing until reaching a programmable threshold value 166, where the programmable threshold value 166 is a value indicating the allotted memory allocation for a program and thus, may vary from program to program. Upon reaching the threshold value 166, the memory usage counter 168 may send a request for garbage collection. In some embodiments, the JVM may also monitor the counter value to decide when to launch the garbage collector 158. The garbage collector 158 may thus access memory 106 and free consumed memory space not needed by the programs anymore. The amount of "recycled" memory space may then be re-allocated to the programs. The counter may be decremented accordingly to reflect the freed memory space.

In Java, specific instructions may request memory allocation but these instructions do not encode within their respective Bytecode the amount of memory requested. Instead the JVM must look for this amount within Java data structures (e.g., Java class) before allocating the memory or sending a request to the operating system on which the JVM runs.

In a first embodiment, the decoder 152, when decoding a Java "New" or "NewArray" Bytecode, or any of the other Java Bytecode requesting new memory, provides a signal to update the hardware-implemented, memory usage counter 168 by a determined value. However, since these Bytecodes belonging to the standard Java instruction set do not specify the amount of memory needed directly, an approximated value is used to update the memory usage counter 168, while the precise memory allocation is done by software by the JVM. The approximate value may be one where the memory usage counter 168 may count the number of memory allocation request rather than the precise amount of memory used to initiate the garbage collector. The approximate value may be an average value for the object size used by the current program to give a more precise indication to the garbage collector or to the task initiating the garbage collector.

Java Bytecodes, such as "New" Bytecode, "NewArray" Bytecode or any other Bytecode requesting some memory allocation are complex Bytecodes when executed by the JSM 102 and may be replaced by a micro-sequence. In a second embodiment, the micro-sequence, replacing the Java Bytecodes, may be utilized to precisely update the memory usage counter. The micro-sequence may retrieve the exact number of bytes required for the memory allocation within a Java data structure (e.g. Java class) and consequently may update the memory usage counter 168 precisely as a part of or before the memory allocation request.

In either previously described embochments, the value of the memory usage counter 168 may be compared to that of a threshold value 166, and upon approaching the threshold, the JSM 102 may send to the MPU 104 an interrupt signal, which indicates the need for garbage collection. The MPU 104 may then initiate the garbage collector 158 in the memory 106, where the garbage collector may evaluate memory 106. After freeing consumed memory resources that may not be needed, the memory usage memory usage counter 168 may be updated. The memory usage counter 168 may now again be used to monitor the memory consumption and may be incremented as described above.

In another embodiment, where the counter is updated by software, the software being executed on the JVM 108, the MPU 104, or a micro-sequence executed on the JSM 102, the memory usage counter may also be a value in memory. As such, the garbage collector must poll this value instead of receiving an interrupt from the memory usage counter, implemented in hardware, and then compare the value to a threshold value. As such, the MPU 104 may utilize interface 170 to access the memory counter 168.

By utilizing a counter which monitors the memory consumption of the programs, the garbage collector may only be initiated when memory resources are becoming rare and memory recollection is likely to he needed and useful. The preferred embodiments therefore reduce the number of times the garbage collector is executed. The power consumption of the overall system is reduced as well as the throughput of the processor is increased.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A system, comprising:
   a memory device;
   a first processor that executes a first program;
   a counter coupled to the memory device and the first processor, wherein a value of the counter is indicative of memory consumption of memory of the memory device by the first program;
   a second processor coupled to the memory device, the second processor executes a garbage collector to free a portion of unused memory in the memory device; and
   wherein executing the garbage collector by the second processor is triggered based on the value of the counter.

2. The system of claim 1, wherein the value is a programmable threshold value, and wherein when the counter reaches the programmable value, the garbage collector is triggered.

3. The system of claim 2, wherein upon reaching the programmable threshold value, the counter sends an interrupt value to the second processor to initiate the garbage collector.

4. The system of claim 2, wherein a software process is regularly polling the counter to check if the predetermined threshold value has been reached, and wherein upon reaching the predetermined threshold value, the garbage collector is triggered.

5. The system of claim 1, wherein the first processor further comprises a decoder coupled to the counter, wherein upon decoding an instruction of the first program requesting memory allocation, the counter is updated with an estimated memory usage value for the instruction.

6. The system of claim 1, wherein the first processor replaces an instruction of the program requesting memory allocation with a micro-sequence, wherein upon executing an instruction from the micro-sequence requesting memory allocation by the first processor the counter is updated with an exact memory usage value for the instruction of the first program.

7. The system of claim 6, wherein the counter resides within the memory device.

8. The system of claim 1, wherein a software process is triggered by an instruction of the first program that requests memory allocation, and wherein prior to performing or requesting another memory allocation task, the software process executing on the first processor increments the counter indicative of the memory consumed.

9. A system, comprising:
   a first processor that executes a garbage collector to free unused memory resources within a memory device;
   a second processor coupled to the first processor and the memory that executes a program that allocates memory within the memory device;
   a counter coupled to the first and second processors, wherein the counter indicates memory consumption for the program; and
   wherein upon surpassing a threshold value, the counter triggers the garbage collector.

10. The system of claim 9, wherein the system further comprises a decoder within the second processor coupled to the counter, and wherein the decoder provides information to update the counter.

11. The system of claim 10, wherein the decoder decodes a standard Java instruction requesting memory allocation.

12. The system of claim 11, wherein the counter is updated with an approximate memory usage value.

13. The system of claim 10, wherein the decoder decodes an instruction from a micro-sequence requesting memory allocation.

14. The system of claim 13 and wherein the counter is updated with an exact memory usage value.

15. The system of claim 9, wherein the counter is monitored periodically by a software process that triggers the garbage collector when the counter reaches a predetermined threshold, and wherein the software process executes in at least one selected from the group consisting of: the first processor; or the second processor.

16. The system of claim 9, wherein the first processor is a main processor and the second is a processor that directly executes at least some Java bytecodes.

17. The system of claim 9, wherein the system is a cellular telephone.

18. A computer-readable storage medium comprising a plurality of instructions that, when executed by a processor, cause the processor to:

monitor memory consumption of a memory device for one or more programs executed in a first processor;

trigger a garbage collector program in a second processor to free a portion of the memory upon surpassing a threshold memory consumption; and update a memory usage counter after retrieving a portion of the memory.

19. The computer-readable storage medium as defined in claim 18 wherein when the processor monitors memory consumption, the instructions cause the processor to monitor memory consumption of the one or more programs on the first processor being the same processor on which the plurality of instructions execute.

20. The computer-readable storage medium as defined in claim 18 wherein when the processor monitors memory consumption, the instructions cause the processor, being the second processor, to monitor memory consumption of the one or more programs on the first processor.

21. The computer-readable storage medium as defined in claim 18 wherein when the processor monitors memory consumption, the instructions cause the processor to monitor the value of a counter.

22. The computer-readable storage medium as defined in claim 21 wherein when the processor monitors the counter the instructions cause the processor to monitor the counter in the first processor.

* * * * *